US011535518B1

United States Patent
Shi et al.

(10) Patent No.: US 11,535,518 B1
(45) Date of Patent: Dec. 27, 2022

(54) PRODUCTION OF GRAPHENE-STRUCTURED PRODUCTS FROM COAL USING THERMAL MOLTEN SALT PROCESS

(71) Applicant: Energy, United States Department of, Washington, DC (US)

(72) Inventors: Fan Shi, Pittsburgh, PA (US); McMahan L. Gray, Pittsburgh, PA (US); Christopher Matranga, Pittsburgh, PA (US); Tuo Ji, South Park, PA (US)

(73) Assignee: Energy, United States Department of, Washington, DC (US)

( * ) Notice: Subject to any disclaimer, the term of this patent is extended or adjusted under 35 U.S.C. 154(b) by 748 days.

(21) Appl. No.: 16/369,753

(22) Filed: Mar. 29, 2019

(51) Int. Cl.
*C01B 32/19* (2017.01)
*C01B 32/196* (2017.01)

(52) U.S. Cl.
CPC ............ *C01B 32/19* (2017.08); *C01B 32/196* (2017.08); *C01B 2204/24* (2013.01); *C01B 2204/26* (2013.01); *C01P 2002/20* (2013.01); *C01P 2002/88* (2013.01); *C01P 2004/03* (2013.01); *C01P 2004/04* (2013.01)

(58) Field of Classification Search
CPC ..... C01B 32/19; C01B 32/196; C01P 2204/03
USPC ........................................................ 423/445
See application file for complete search history.

(56) References Cited

U.S. PATENT DOCUMENTS

| 2012/0321545 | A1* | 12/2012 | Jeon ...................... C01B 32/19 423/448 |
| 2015/0125604 | A1* | 5/2015 | Botte ................... C23C 16/455 427/249.1 |
| 2019/0119115 | A1* | 4/2019 | Mellor ................... C01B 32/19 |

FOREIGN PATENT DOCUMENTS

WO    WO2017141044    * 8/2017

OTHER PUBLICATIONS

Selective Recovery of Rare Earth Elements from Coal Fly Ash Leachaes Using Liquid Membrane Processes. Ryan C. Smith et al Environ. Sci. Technol. V53 pp. 4490-4499 (Year: 2019).*
CO and C02 emissions from spontaneous heating of coal under different ventilation rates L Yuan et al. International Journal of Coal Geology, V 88, Issue 1, pp. 24-30 (Year: 2011).*

* cited by examiner

*Primary Examiner* — Douglas B Call
(74) *Attorney, Agent, or Firm* — Aaron R. Keith; Jacob A. Heafner; Michael J. Dobbs (57) ABSTRACT

The invention provides a method for the production of graphene-structured products. The method generally comprises contacting at a conversion temperature ranging from about 850° C. to about 1100° C. in an inert atmosphere coal with a molten salt to produce a graphene-structured product. In an alternate embodiment, the method comprises contacting at a conversion temperature ranging from about 850° C. to about 1100° C. in an inert atmosphere coal with a molten salt to produce a graphene-structured product; and, separating a rare earth element from the graphene-structured product.

27 Claims, 13 Drawing Sheets

PRODUCTION OF GRAPHENE-STRUCTURED PRODUCTS FROM COAL USING THERMAL MOLTEN SALT PROCESS

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to a method for the production of graphene from coal stocks. The disclosed method also provides the co-production of refined oils and rare earth elements.

BACKGROUND OF THE INVENTION

American coal production has declined from a peak of ~1.2 billion tons in 2007-2008 to ~0.7 billion tons in 2016. This decline has coal companies exploring new and previously unrealized market opportunities for coal products. American coal can be used to manufacture a wide range of solid carbon products including carbon fiber, carbon additives for cements and structural composites, battery and electrode materials, carbon nanomaterials and composites, and 3D printing materials. The market value of high performance carbons exceeds the fuel and heat value of coal, which illustrates there are sustainable market forces to manufacture carbon materials from coal.

The present disclosure provides a method for making graphene directly from domestic coal. The method also allows for co-production of rare earth elements and distilled crude oil type liquids. Graphene is a 2-dimensional single sheet of carbon atoms arranged in a hexagonal network. Graphene can exhibit outstanding surface areas (2630 m$^2$ g$^{-1}$), high Young's modulus (1 TPa), high thermal conductivity (5000 W mK$^{-1}$), strong chemical durability and high electron mobility (2.5×105 cm$^2$ V$^{-1}$ s$^{-1}$). These properties make it ideal for imparting mechanical strength, corrosion resistance, thermal/electrical conductivity, and unique optical properties to devices and composites. Despite carbon nanomaterials being discovered in 1985 and being the subject of intense research and development activities, there have been very few commercialized technologies that utilize the unique properties of these materials.

The high costs ($20-100/gram; $20,000,000-$100,000,000/metric tonne) and low supplies (estimated at <25,000 tonnes/yr) of carbon nanomaterials is one reason these materials have not been widely commercialized for imparting unique properties to devices and composites. The cost & supply issues are driven, in part, by the complicated growth methods and processes currently used to make these materials. Most processes for making graphene utilize petroleum derivatives, natural gas, or other light gases (CO) as the feedstocks. In additional to being more expensive than domestic coal, these feedstocks lack any of the "graphite-like" molecular structures required to make graphene. As such, these feedstocks must be broken down into light reactive atomic and molecular fragments and then "built back up" atom-by-atom in a catalytic process to create the complicated carbon structures in graphene. The energy, costs, and technical challenges associated with creating complex carbon materials, atom-by-atom, makes it advantageous to look for other processes to make graphene that do not require natural gas- or petroleum-based feedstocks.

Coal naturally contains graphite-like molecular structures making it an ideal feedstock for making graphene-type nanomaterials. These graphene-like materials can easily be extracted from the coal using both physical and chemical processing technologies. By using the natural graphene like molecules contained in coal, the costs and technical challenges associated with making graphene are significantly reduced.

The present disclosure also provides for co-production of rare earth elements and distilled crude oil products. The co-production of high value carbon nano-sheet as graphene-structured products graphene), high valued rare earth elements, and crude oil liquids is an opportunity to maximize the profitability of a coal-based manufacturing processes with 3 unique product streams.

Accordingly, it is an object of this disclosure to provide a method for the production of graphene-structured products from coal stocks. The method comprises contacting coal with a molten salt at a conversion temperature from about from about 850° C. to about 1100° C. while under an inert atmosphere to produce the graphene-structured product.

These and other objects, aspects, and advantages of the present disclosure will become better understood with reference to the accompanying description and claims.

SUMMARY OF THE INVENTION

Embodiments of the invention relate to a method for the production of graphene-structured products. The method generally comprises contacting at a conversion temperature ranging from about 850° C. to about 1100 CC in an inert atmosphere coal with a molten salt to produce a graphene-structured product. In an alternate embodiment, the method comprises contacting at a conversion temperature ranging from about 850° C. to about 1100° C. in an inert atmosphere coal with a molten salt to produce a graphene-structured product; and, separating a rare earth element from the graphene-structured product. A second alternative embodiment provides contacting coal and molten salt, heating the coal and molten salt through a temperature ranging from about 300° C. to about 700° C. to a conversion temperature ranging from about 850° C. to about 1100° C. in an inert atmosphere to produce a graphene-structured product; and capturing a tailing gas produced from heating at a temp ranging from about 300° C. to about 700° C. In another embodiment, a method provides for the production of graphene-structured products by contacting coal with a molten salt, heating the coal and molten salt through a temperature ranging from about 300° C. to about 700° C. to a conversion temperature ranging from about 850° C. to about 1100° C. to produce a graphene-structured product; capturing a tailing gas produced from heating at a temp ranging from about 300° C. to about 700° C.; and, separating rare earth elements from the graphene-structured product.

BRIEF DESCRIPTION THE DRAWINGS

These and other features, aspects, and advantages of the multiple embodiments of the present invention will become better understood with reference to the following description, appended claims, and accompanied drawings where:

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for the production of graphene-structured products from coal.

The method for provides for the production of graphene-structured products. Graphene-structured products are graphene nano-sheets with thickness less than 3 nm. Notably, the method provides for thin layer graphene products, where thin layer graphene products are single to few layer graphene materials with a thickness less than 2.0 nm.

Figure 1A:
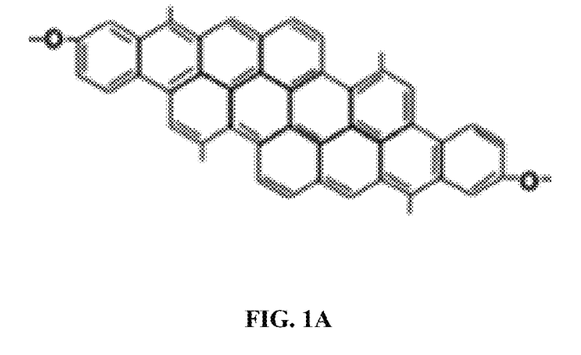
FIG. 1A depicts an exemplary structure for anthracite coal.
Figure 1B:
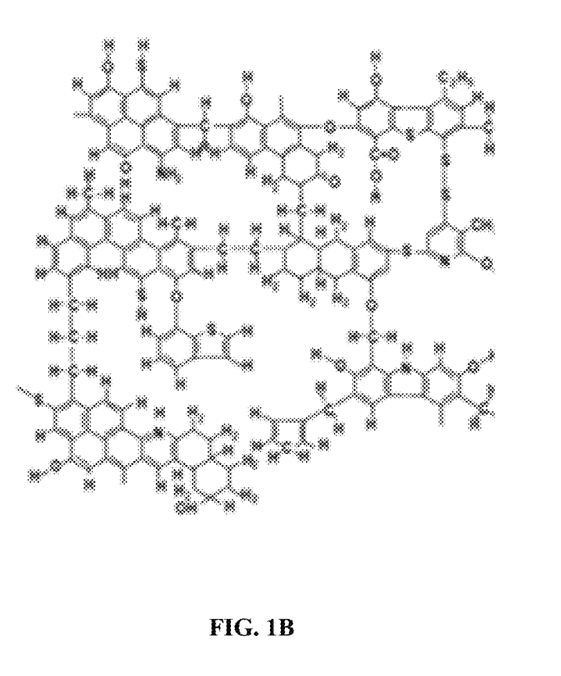
FIG. 1B depicts an exemplary structure for bituminous coal.
Figure 1C:
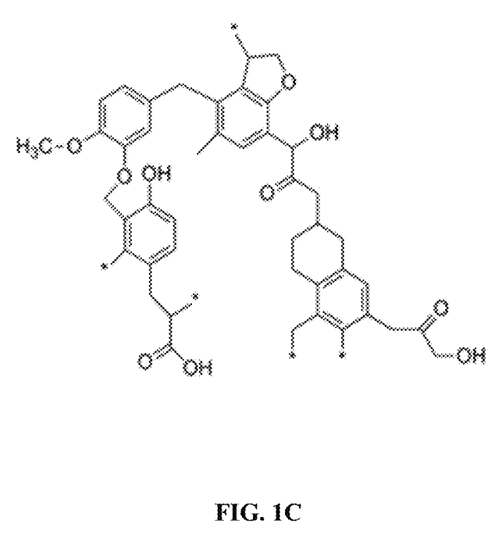
FIG. 1C depicts an exemplary structure for lignite coal.

The graphene-structured products are produced from the conversion of coal. As noted above, coal naturally contains graphite-like molecular structures as in FIGS. 1A-1C illustrating anthracite, bituminous coal, and lignite respectively. Coal contemplated for use within the method includes different ranks of raw coals from anthracite, bituminous, and lignite coal, as well as coal-derived carbonous feeds, i.e., coal refuse and beneficiated coal. These coals were anthracite, bituminous, and lignite coal powders with particle sizes less than 10 microns.

To facilitate the conversion of coal to graphene-structured products, coal is contacted with molten salts. Molten salts are salts which are solids at standard temperature and pressure but enter a liquid phase at elevated temperatures. As such, the molten salts for use within the method include the salts while in a solid state, becoming a molten (liquid) state at an elevated temperature. Molten salts for use within the method include the salts NaCl, KCl, $CaCl_2$, LiCl, $AlCl_3$, $NiCl_2$, and NaCl/KCl, $CaCl_2$/KCl, LiCl/KCl. LiCl/NaCl mixtures. These salts have the characteristics particle sizes less than 500 microns and purities greater than 99%. Preferred molten salts include NaCl, KCl, $CaCl_2$, LiCl, $AlCl_3$, $NiCl_2$. Most preferred molten salts include NaCl, KCl and $CaCl_2$.

The molten salts may also include molten salt mixtures, where a molten salt mixture is a combination of two or more molten salts. For example, a mixture of the molten salts may include $CaCl_2$ and KCl.

The method comprises a contacting step. In contacting, the molten salt and coal are in physical, chemical, thermal, or any combination thereof communication with each other. In a typical operation, the coal and molten salt are combined as two granular solids and mixed to form a uniformly dispersed mixture. The mixture is then heated, such that the molten salt transitions to a liquid phase. As such, it is contemplated constituents may be brought into physical communication at a temperature other than the conversion temperature, then brought to the conversion temperature of contacting. Contacting may be performed through methods generally known in the art, such a batch-wise, conveyers, etc. Additionally, contacting at the conversion temperature is performed under an inert atmosphere, for example, under $N_2$, $CO_2$, or mixtures thereof.

The coal and molten salt constituents are in contact at a conversion temperature, where a conversion temperature is above the melting point of the molten salt and at which the coal feedstock undergoes conversion to the graphene-structured product. The temperature of conversion ranges from about 850° C. to about 1100° C. A preferred temperature range is from about 900 CC to about 1000° C.

Figure 2:
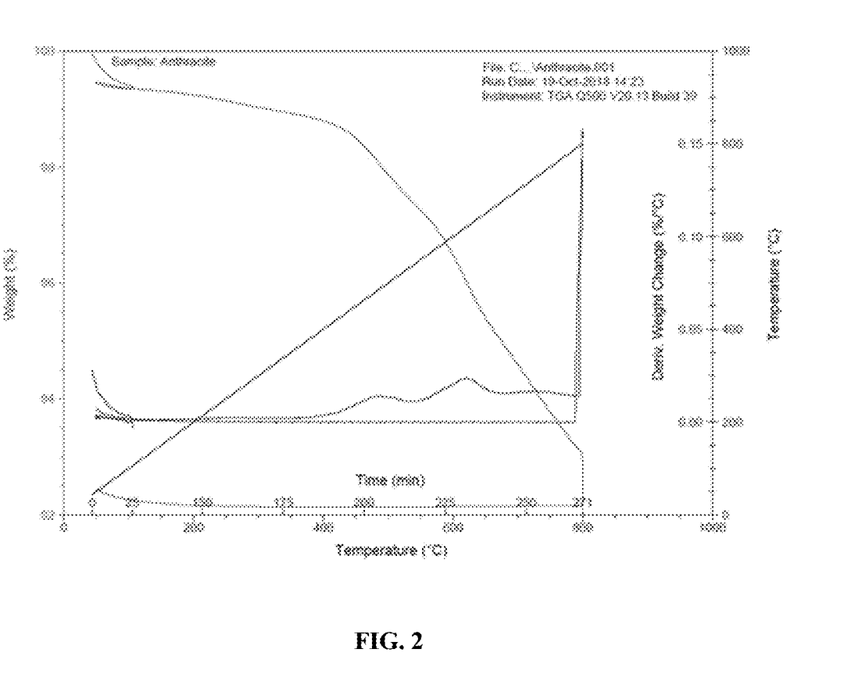
FIG. 2 depicts a graph the deriv. weight change (%/° C.) of anthracite during heating.
Figure 3:
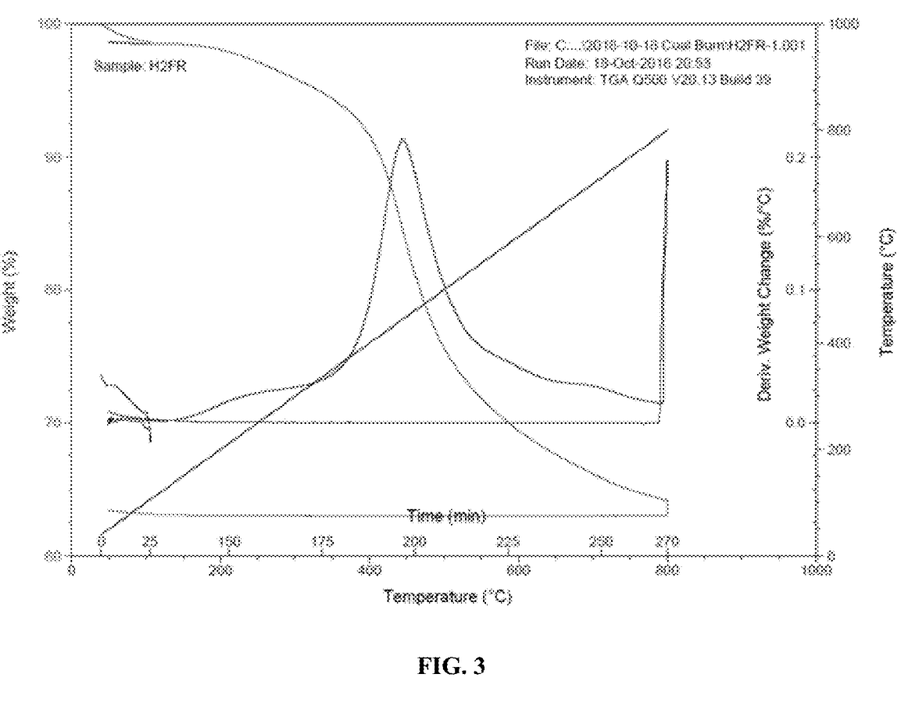
FIG. 3. depicts a graph the deriv. weight change (%/° C.) of bituminous coal during heating.
Figure 4:
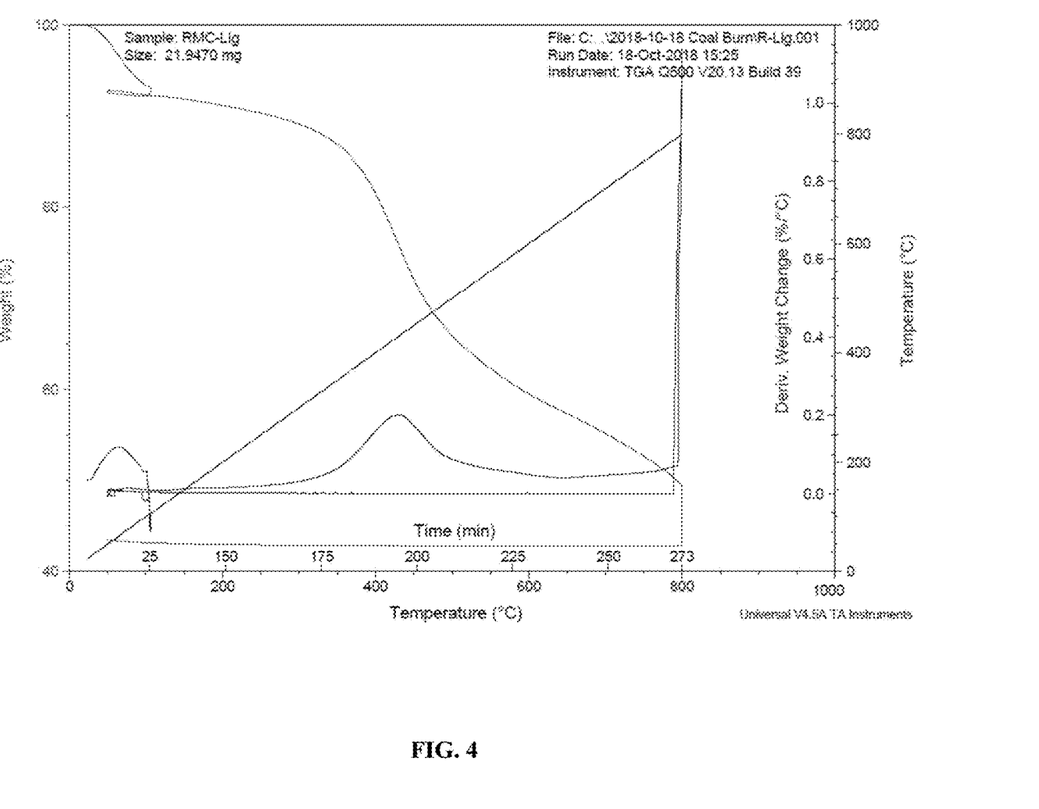
FIG. 4. depicts a graph the deriv. weight change (%/° C.) of Lignite/sub-bituminous coal during heating.

In one embodiment, the method further comprises heating the coal and molten salt through a temperature to the conversion temperature, and capturing a tailing gas. Tailing gas comprises at least one gas that, which when condensed, is a petroleum distillate type fluid. Tailing gases are formed from the partial decomposition of the coal during the heating. The tailing gases are of specific gravity >1.2 (water is 1.0), boiling point greater than 250° C., and mixed molecular weights of typical coal tar pitch. Heating the coal and salt is through a temperature ranging from about 300° C. to about 700° C. to facilitate the decomposition of the coal and the formation of the tailing gases. Dependent on the grade of coal, as much as 35 wt % of the coal may be captured as tailing gas. FIGS. 2, 3, and 4 depict tailing gas capture from anthracite (<5%), bituminous coal (30%), and sub-bituminous (35%) respectively.

During heating, a capturing operation facilitates the trapping of the tailing gases. Capturing may be performed by such operations such as trapping the tailing gas then processing the tailing gas through a condensation operation. The condensation operation condenses the tailing gases to the petroleum distillate type fluid.

Another embodiment provides separating rare earth elements from the graphene structured products. Rare earth elements are commonly present in coals in mineral formations such as fluorocarbonate-based bastnasite, phosphate-based monazite, as well as pyrite and marcasite. Among the 17 rare-earth elements cerium, dysprosium, erbium, europium, gadolinium, holmium, lanthanum, lutetium, neodymium, praseodymium, promethium, samarium, scandium, terbium, thulium, ytterbium, and yttrium, those predicted to be in highest predicted include lanthanum, neodymium, and cerium.

Separating any rare earth elements from the graphene-structured products may be accomplished by common methods used to capture metals, including REEs, from water include flotation; solvent extraction; adsorption, accomplished using amine or carboxylate/carboxylic functionalized polymer beads or silica-supported sorbents; separation, which has been done with amine or amidoximine-functionalized electrospun polymer fiber membranes; and solvent extraction by expensive ionic liquids.

In one exemplary separating operation is separating by acid wash. The graphene-structured products are allowed to cool to ambient temperature. Once cooled, the graphene-structured products are soaked in 1.0 M HCL solution. The mixture is then filtered, removing any water-soluble rare-earth elements via the filtrate and leaving the graphene-structured products. The water-soluble rare earth elements may then be recovered from the filtrate using known techniques as noted above.

EXAMPLES

Figure 5:
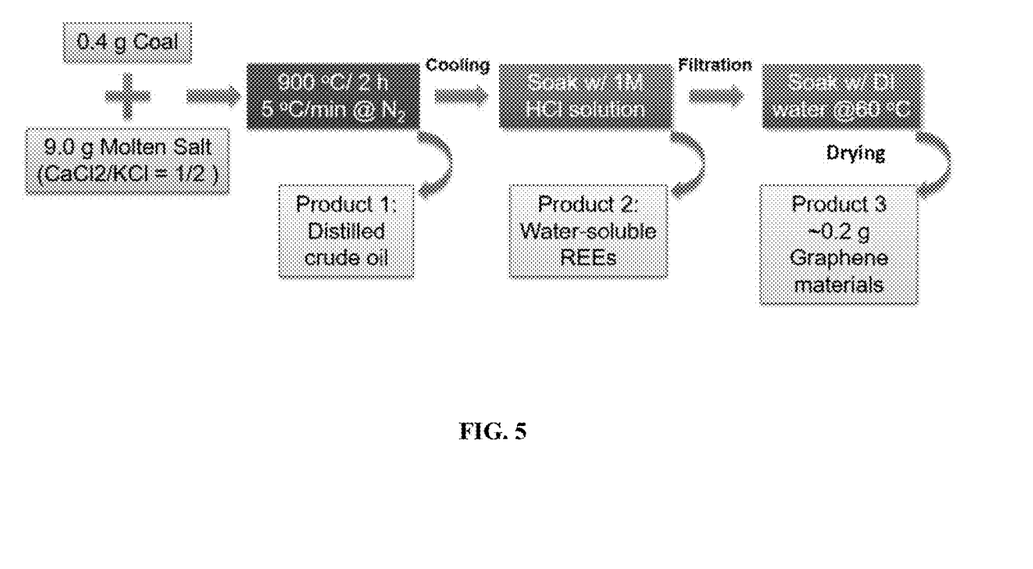
FIG. 5. depicts a general operation scheme for carrying out the disclosed method for the production of graphene-structured products, capturing a tailing gas, and separating rare earth elements from the graphene-structured products.

The general operation scheme illustrated at FIG. 5, where coal and a molten salt (mixture) were combined, heated through a temperature to the conversion temperature, distilled crude oil type products were captured, the remaining graphene-structured products were cooled and acid washed to separate rare earth elements, and the graphene-structured products were washed in distilled water to neutralize the previous acid wash.

Coal sample (H2-FR757) is a clean coal after floatation (#240, Kentucky). ICP/CHNS result showed H2-FR757 coal has 77 wt % of carbon, 6.28 wt % of ash, 0.9 wt % of sulfur, and 137 ppm of total rare earth elements. 0.4 g of the coal was mixed thoroughly with 9.0 g of eutectic salts of KCl/CaCl$_2$ (2:1 by weight). The mixture was heated to 900° C. with a heating rate of 5° C. min$^{-1}$ and kept for 2 h in a temperature-programmed tube furnace under an N$_2$ flow. Tailing gas passed through an ice-bath at 0° C. to collect distilled crude oil liquid. After cooling down to room temperature, resulting solid product was soaked in 1 M hydrochloric acid (HCl) solution for 1 h. The solid sample was filtrated and leached liquid was saved for the recovery of water-soluble REEs. After soak/rinsed with DI water to remove salts and collected by filtration, the final product dried at 110° C. for 24 h and named as molten salt (MS) coal sample. To ascertain the influence of salts, bare coal-derived carbon was synthesized through the same procedure without the addition of molten salts.

Figure 6A:
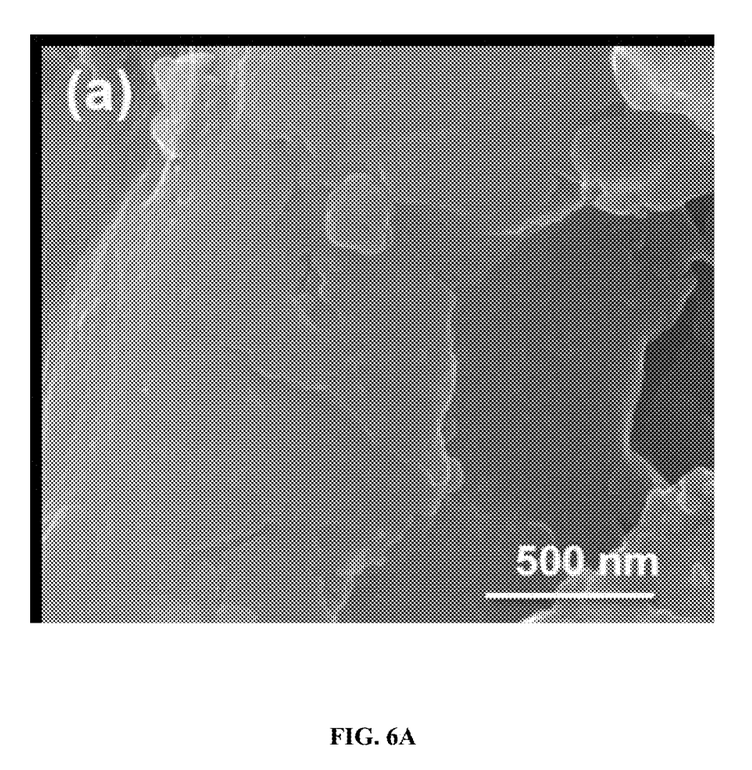
FIG. 6A. depicts a scanning electron microscopy (SEM) view of calcined coal sample H2-FR757.
Figure 6B:
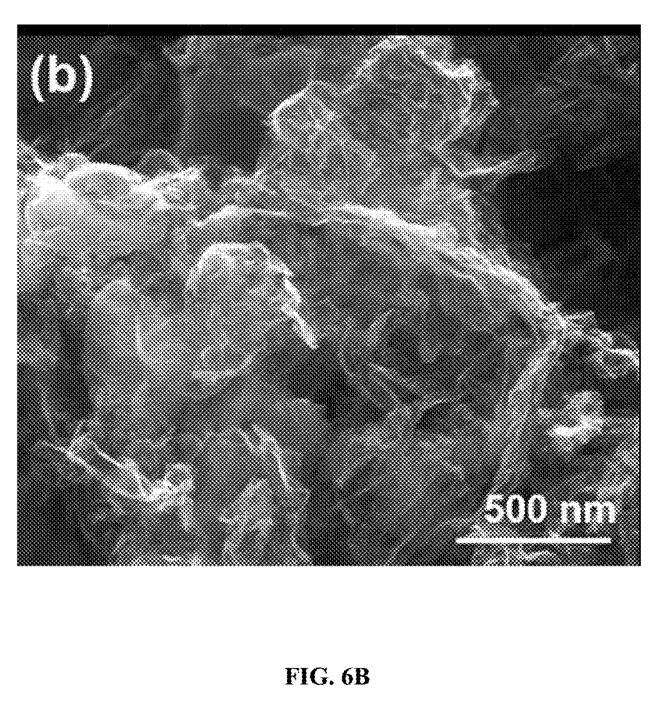
FIG. 6B depicts a scanning electron microscopy (SEM) view of calcined molten salt coal sample H2-FR757 (MS-H2-FR757).
Figure 7:
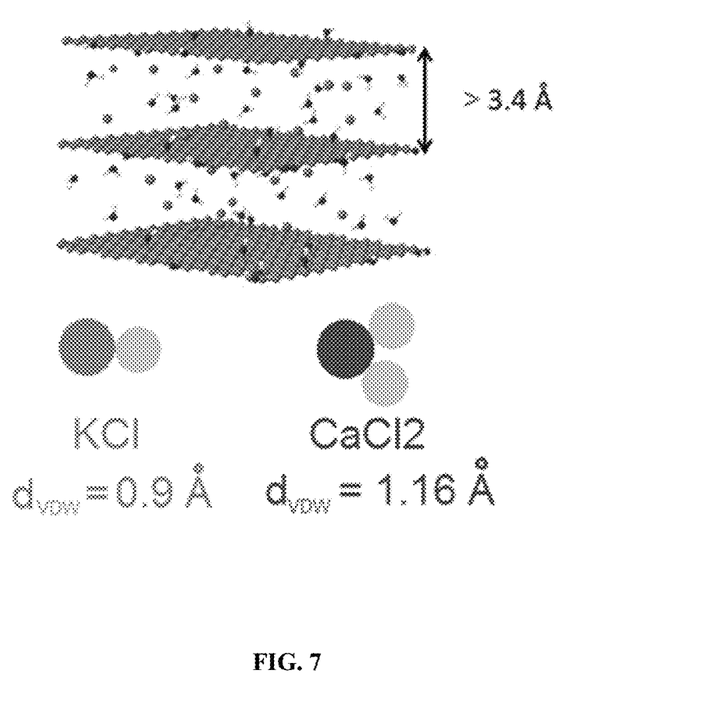
FIG. 7, illustrates a possible mechanism for the conversion of coal to graphene-structured products where the molten salt opened the graphitic interlayers and exfoliated the graphite sheets.

FIG. 6A and FIG. 6B show the scanning electron microscopy (SEM) of as-obtained samples. It can be clearly seen that the sheet structure morphology of (b) MS-H2-FR757 coal is different from the bulk structure of coal-derived carbon (a). The structure of two materials was further studied by Brunauer-Emmett-Teller (BET) analysis. BET result showed the surface area of MS-H2-FR757 coal is 96.1 m$^2$/g, which is significantly higher than 4.5 m$^2$/g of coal-derived carbon. This result indicated conversion as the molten salt opened graphite interlayer and exfoliated the graphite sheets as illustrated in FIG. 7.

Figure 8A:
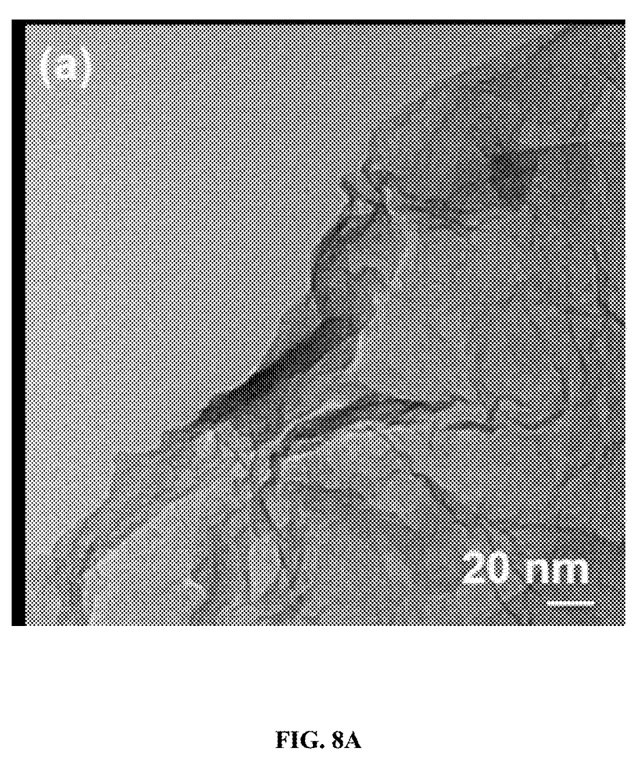
FIG. 8A. depicts a Transmission electron microscopy (TEM) scan of the nano-structure property of MS-H2-FR757 showing the ultrathin sheet-like 2 D structure.
Figure 8B:
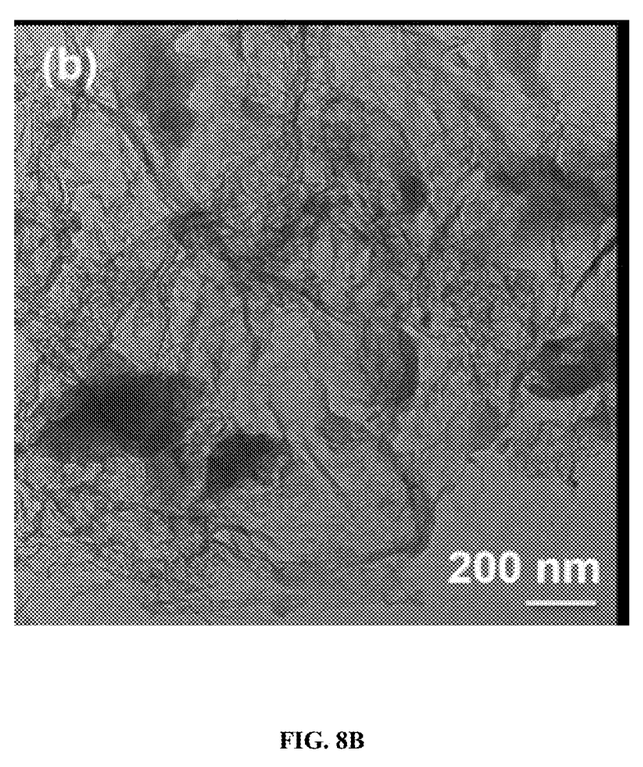
FIG. 8B depicts a TEM scan where large nanoparticles present may be ascribed to un-exfoliated graphite particles.

Transmission electron microscopy (TEM) was employed to further reveal the nano-structure property of MS-H2-FR757 coal sample. FIG. 8A clearly showed the ultrathin sheet-like 2 D structure. Some large nanoparticle in FIG. 8B may be ascribed to un-exfoliated graphite particles because of their transparence.

Figure 9:
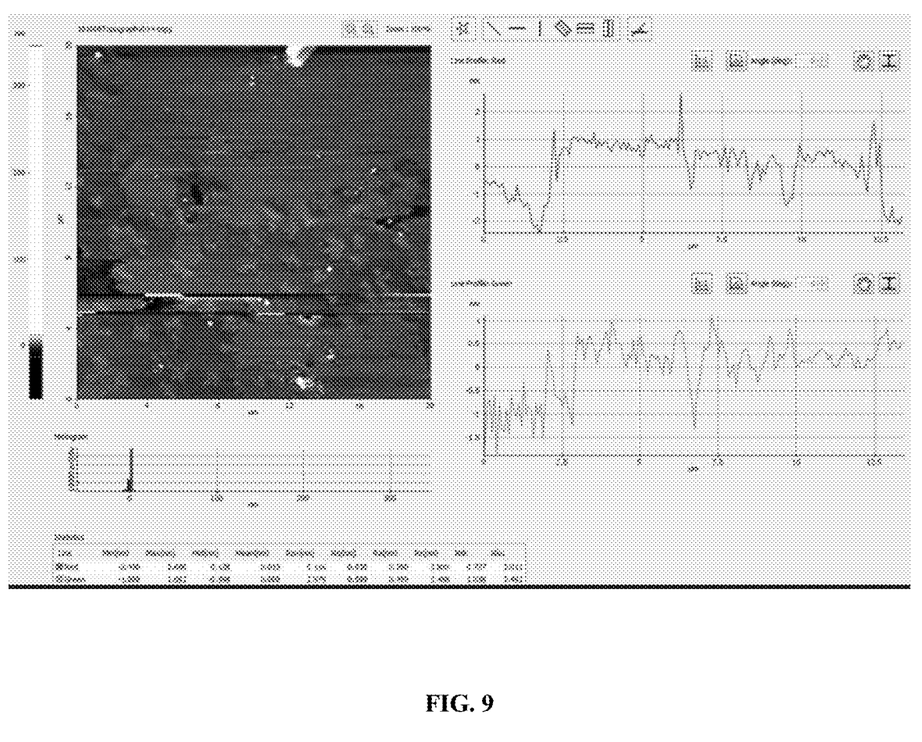
FIG. 9. depicts an atomic force microscopy (AFM) scan characterizing the few-layer structure of MS-H2-FR757.

The thickness of possible graphene sheets was estimated by atomic force microscopy (AFM). To better estimate the value, MS-H2-FR757 coal samples were dispersed in ethanol and sonicated for one hour. Additional sonication was conducive to open the accumulated structure and then the height of graphene sheet decrease to about 1 nm. As noted the thickness of single-layer graphene is 0.335 nm. The results in FIG. 9 revealed that MS-H2-FR757 coal sample was graphene structured material of less than 3 layers, which distinguish from other less valued multi-layered graphene materials.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference 1.0 given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

The embodiment of the invention in which an exclusive property or privilege is claimed is defined as follows:

1. A method for the production of a graphene-structured product, the method comprising:
    contacting at a conversion temperature ranging from about 850° C. to about 1100° C. coal with a molten salt to produce a graphene-structured product, wherein the contacting step further comprises combining the coal and molten salt to form a uniformly dispersed mixture of said coal and said molten salt.

2. The method of claim 1, wherein the molten salt is selected from a group consisting of NaCl, KCl, CaCl$_2$, LiCl, AlCl$_3$, and NiCl$_2$.

3. The method of claim 2, wherein the molten salt is NaCl or KCl.

4. The method of claim 1, wherein the molten salt is a molten salt mixture.

5. The method of claim 4, wherein the molten salt mixture comprises CaCl$_2$ and KCl.

6. The method of claim 5, wherein the graphene-structured product is a few-layer graphene structured product.

7. The method of claim 1, further comprising recovering a rare earth element from the graphene-structured product.

8. The method of claim 7, wherein recovering is by acid wash.

9. The method of claim 1 wherein the contacting and heating steps generate graphene-structured product directly from coal.

10. A method for the production of graphene-structured product, the method comprising:
contacting coal and molten salt, wherein the contacting step further comprises combining the coal and molten salt to form a uniformly dispersed mixture of said coal and said molten salt;
heating the mixture through a temperature ranging from about 300° C. to about 700° C. to a conversion temperature ranging from about 850° C. to about 1100° C. to produce a graphene-structured product; and
capturing a tailing gas produced from heating at a temp ranging from about 300° C. to about 700° C.

11. The method of claim 10, wherein the molten salt is selected from a group consisting of NaCl, KCl, $CaCl_2$, LiCl, $AlCl_3$, and $NiCl_2$.

12. The method of claim 11, wherein the molten salt is NaCl or KCl.

13. The method of claim 10, wherein the molten salt is a molten salt mixture.

14. The method of claim 13, wherein the molten salt mixture comprises $CaCl_2$ and KCl.

15. The method of claim 10, wherein the graphene-structured product is a thin layer graphene structured product.

16. The method of claim 10, further comprising condensing the tailing gas to a petroleum fluid.

17. The method of claim 10 wherein the contacting and heating steps generate graphene-structured product directly from coal.

18. A method for the production of graphene-structured products, the method comprising:
contacting coal with a molten salt, wherein the contacting step further comprises combining the coal and molten salt to form a uniformly dispersed mixture of said coal and said molten salt;
heating the mixture through a temperature ranging from about 300° C. to about 700° C. to a temperature ranging from about 850° C. to about 1100° C. to produce a graphene-structured product;
capturing a tailing gas produced from heating at a temp ranging from about 300° C. to about 700° C.; and,
separating rare earth elements from the graphene-structured product.

19. The method of claim 18, where separating is by acid washing.

20. The method of claim 18, wherein the molten salt is selected from a group consisting of NaCl, KCl, $CaCl_2$, LiCl, $AlCl_3$, and $NiCl_2$.

21. The method of claim 20, wherein the molten salt is NaCl or KCl.

22. The method of claim 18, wherein the molten salt is a molten salt mixture.

23. The method of claim 22, wherein the molten salt mixture comprises $CaCl_2$ and KCl.

24. The method of claim 18, wherein the graphene-structured product is a thin layer graphene structured product.

25. The method of claim 18, further comprising condensing the tailing gas to a petroleum fluid.

26. The method of claim 18, wherein separating is by acid washing, the molten salt is NaCl; the graphene-structured product is a thin layer graphene-structured product; and further comprising condensing the tailing gas to a petroleum fluid.

27. The method of claim 18 wherein the contacting and heating steps generate graphene-structured product directly from coal.

* * * * *